United States Patent [19]

Vollmer et al.

[11] 4,402,873
[45] Sep. 6, 1983

[54] EXTRACTION OF PROTEIN FROM PORK BONES

[75] Inventors: Arthur N. Vollmer; Richard G. Rosenfield, both of Canton, Ohio

[73] Assignee: Sugardale Foods Incorporated, Canton, Ohio

[21] Appl. No.: 421,807

[22] Filed: Sep. 23, 1982

[51] Int. Cl.$^3$ .............................. A23J 1/10; C09H 3/00
[52] U.S. Cl. ........................................ 260/118; 426/7; 426/32; 426/56; 426/59; 426/657; 260/112 R
[58] Field of Search ............... 260/112 R, 118; 426/7, 426/657, 32, 56, 59

[56] References Cited

U.S. PATENT DOCUMENTS

| | | | |
|---|---|---|---|
| 2,384,673 | 9/1945 | Greffie | 260/118 |
| 2,717,835 | 9/1955 | Brody | 260/112 R |
| 3,539,549 | 11/1970 | Greenfield | 260/112 R |
| 3,887,717 | 6/1975 | Pfeiffer et al. | 260/112 R |
| 4,176,199 | 11/1979 | Vollmer et al. | 426/59 |
| 4,294,753 | 10/1981 | Urist | 260/112 R |
| 4,350,624 | 9/1982 | Herubel | 260/112 R |

*Primary Examiner*—Howard E. Schain
*Attorney, Agent, or Firm*—Frease & Bishop

[57] ABSTRACT

Protein is extracted from fresh or cured pork bones to produce an aqueous solution of about 4% to 7% protein, as well as a lard by-product and cooked bone fragments which may be ground and sold as bone meal. Bone fragments of the desired maximum dimension are combined with substantially equal parts of water and are heated to above the boiling point of water when papain proteolytic enzymes are added in controlled proportions. The aqueous bone-enzyme mixture is heated in the 135° F. to 145° F. range for two hours when salt is added in controlled proportions followed by heating the mixture at 145° F. for one hour and then rapidly heating the mixture for 5 to 10 minutes to 195° F., then heating at, but not above, 195° F. for ½ hour followed immediately by chilling as rapidly as possible to 150° F. The solids are separated from the liquids and the liquids centrifuged to separate the lard product and aqueous protein solution.

10 Claims, No Drawings

EXTRACTION OF PROTEIN FROM PORK BONES

CROSS-REFERENCE TO RELATED PATENT

The new procedure of the invention for extracting protein from pork bones involves a critical change in the method of extracting protein from beef bones disclosed in Vollmer et al. U.S. Pat. No. 4,176,199.

BACKGROUND OF THE INVENTION

1. Field of the Invention

The invention relates to an economically feasible procedure for extracting protein from pork bones to produce a usable end product solution containing a desirable protein concentration. More particularly the invention relates to critical controls that must be exercised in the batch treatment of pork bones to stop denaturing of the pork protein which if not stopped may destroy the usability of the batch solution.

Further, the invention relates to a procedure for extracting protein from pork bones involving batch cooking and processing of the general type heretofore successfully used for extracting protein from beef bones as described in U.S. Pat. No. 4,176,199; but which known procedure is modified to include critical controls which prevent frequent unpredictable production of an unusable end product solution when using the method of said U.S. Pat. No. 4,176,199.

2. Description of the Prior Art

The economically successful method of extracting protein from beef bones set forth in said Patent No. 4,176,199 was initially believed to be applicable to protein extraction from pork bones. However, unpredictable complete failures were encountered in numerous attempts to use this prior batch beef bone protein extraction procedure or treatment in processing pork bones.

Very occasionally such prior art treatment of one batch of pork bones unaccountably turned out to be favorable. Nevertheless numerous attempts to repeat such occasional favorable results ended in failure, and in complete loss of many, many batches of treated pork bones and cooked solution. The protein solution or soup or broth end product was not usable for flavoring or protein supplement purposes. This led to extended efforts during a long time period to solve the problem.

The problem is believed to have existed for many reasons, among others, because there are many different proteins in animal bodies. They differ from animal to animal of the same kind, and in animals of different kinds such as cattle and pigs. They also differ in any animal with age change.

Further, any procedure for extracting protein from animal bodies involves complex chemical reactions. This complexity increases where the differences noted are involved.

We have discovered that freshness or stable condition of the protein content of pork bones maintained refrigerated after packing house deboning is exceedingly short, not more than two to three days. Lack of freshness of pork bones treated may contribute to the problem. Freshness from the standpoint of protein extraction from beef bones is not materially changed over a period of from five to seven or more days when the beef bones are refrigerated.

A further discovery in attempts to solve this problem is that portions of the prior beef bone cooking procedure from the beginning of batch treatment until the cooked soup mixture is filtered and screened to separate liquid from solids must be altered, to successfully extract protein from batch to batch of pork bones, and so as not to produce a protein solution end product which for all practical purposes is worthless because of odor and taste.

This alteration in the prior beef bone treatment procedure involves several related controls, the first of which relates to the heating cycle wherein after heating for approximately 3 to 3½ hours in the range of 135° F. to 145° F. the aqueous pork bone-enzyme-NaCl mixture is heated rapidly in about 10 minutes to 195° F. as in one example in the prior beef treatment.

After such heating cycle proceeds with heating the mixture at 195° F., but not above that temperature, for ½ hour, a radical change in temperature control involves extremely rapidly chilling the mixture or cooked soup stock down to 150° F. as quickly as possible.

The rapid chilling step at the end of the cooking process is necessary to prevent continuing denaturing of the pork protein, which appears to happen much more rapidly with pork bones rather than beef bones. The cooking process has taken the pork protein to the soluble stage, but any further denaturing above 150° F. extends the reaction past the soluble protein state and apparently forms one or more of peptides, polypeptides or peptones.

Accordingly, there is an existing need for an economically feasible and successful procedure for extracting valuable protein from pork bones which may be used as a flavoring agent or a protein supplement in a protein solution having a desired or required degree of protein concentration.

SUMMARY OF THE INVENTION

Objectives of the invention include providing a new process by which protein may be extracted economically from pork bones; providing such process for extracting protein from pork bones by a modification of a known successful process for protein extraction from beef bones, wherein a portion of one beef bone heating cycle is related to a required change, one before and the other after the 195° F. heating stage; providing such process wherein during the heating cycle after heating for approximately 3 to 3½ hours in the range of 135° F. to 145° F., the mixture is rapidly heated in about 10 minutes to 195° F.; providing such process in which the heating cycle is changed following the final cooking stage at, but not above, 195° F. for ½ hour, by rapidly chilling the mixture or cooked soup stock to 150° F. as quickly as possible to prevent continuing denaturing of the pork protein; providing such process for extracting protein from pork bones which produces an aqueous protein broth solution end product having a desirable concentration of about 4–7% by weight, along with producing an edible lard end product also extracted from the pork bones; providing such process which is equally effective in the treatment of both fresh and cured pork bones; and providing such process in which the stated objectives may be achieved in a simple, effective and economically feasible manner with low energy consumption and few chemical additives, and which eliminates indicated problems that have existed in connection with prior attempts to extract protein from pork bones, and solves problems and satisfies needs existing in the field of protein containing food product.

These and other objectives and advantages may be obtained by the new procedure for extracting desirable amounts of protein from pork bones which generally may be described as a procedure in a method of extracting protein from animal bones of the type in which crushed bone fragments having a maximum dimension of up to ⅜" are heated in an aqueous mixture of approximately equal amounts by weight of said bone fragments and water, to which mixture are added papain based proteolytic enzymes of the class consisting of Tona-300 and Papain 90L enzymes in the amount by weight of bone fragments of about 3½% Tona-300 enzymes or 1/10th of 1% Papain 90L enzymes; and in which the aqueous bone-enzyme mixture is heated and agitated during a heating cycle at about at least 135° F. but not exceeding about 155° F. for approximately 3 to 3½ hours with NaCl in the amount of 2% by weight of the bone fragments being added at the end of the second hour of heating; and in which the aqueous bone-enzyme-NaCl mixture following said 3 to 3½ hour heating then is heated at step-up temperatures with a final heating temperature at but not above 195° F. for ½ hour to inactivate the enzymes, followed by filtering and screening the solids from the liquids in the cooked mixture to separate the bone fragments, and then centrifuging the separated liquids to obtain grease products and an aqueous 4% to 7% by weight protein broth; wherein in the extraction of protein from pork bones, the improvement comprises the steps of heating the aqueous bone-enzyme-NaCl mixture, following heating for 3 to 3½ hours at 135° F. to 145° F., rapidly in about ten minutes to 195° F., then heating at but not above 195° F. for ½ hour, and then extremely rapidly chilling the cooked soup stock down to 150° F. as quickly as possible after said heating at 195° F.

DETAILED DESCRIPTION

Embodiments of the new procedure of the invention—illustrative of the best mode in which applicants have contemplated applying the principles—are set forth in the following description and are particularly and distinctly pointed out and set forth in the appended claims. Details of the new procedure are set forth below including examples of failure of prior beef bone procedure in treating pork bones, and of the success of the new method.

The invention, as indicated, involves modification of a known successful process for protein extraction from animal bones, and particularly beef bones, as disclosed in said U.S. Pat. No. 4,176,199, assigned to the assignee of the present invention and incorporated herein by reference in its entirety.

Initially the pork bones are reduced in size by machine crushing or grinding to fragments, having dimensions of not more than ⅜". This crushing or grinding is carried out in the same manner and for the same purposes as in the extraction of protein from beef bones.

The pork bone fragments then are placed with approximate equal parts of water by weight in a heating or cooking container such as a steam jacketed kettle. The use of steam jacketed heating avoids thermal shock to the bone and protein.

As with the extraction of protein from beef bones, papain based proteolytic enzymes are added to the bone and water contents of the kettle. One type of such enzyme (Tona-300, a product of Baxter Laboratories) may be added in the proportion of about 3½% by weight of the bone in the kettle. Another type of such enzyme that is more concentrated (Papain 90L, a product of Baxter Laboratories) may be used in the proportion of 0.056% by weight of the bone in the kettle.

The content of the kettle is heated by portions of the known beef bone heating cycle at controlled rates to maximize the digestion of the pork bone.

Thus, the aqueous pork bone solution in the kettle is heated from 55° F. to 135° F. in about 15 minutes when Papain 90L enxyme is added. Heating proceeds for one hour at 135° F. and then for a second hour at 145° F. when salt (NaCl) is added to the solution being cooked in the proportion of 2.25% by weight of the bone in the kettle.

Heating then proceeds at 145° F. for one hour after which the temperature of the soup being cooked is rapidly raised from 145° F. to 195° F. in 10 minutes. This rapid heating to 195° F. is characteristic of one of the two alternative examples in the prior beef bone treatment of U.S. Pat. No. 4,176,199, but not the other. Such rapid heating appears to be necessarily combined with the rapid chilling step of the invention which provides the successful pork bone treatment. After the rapid heating, final heating at, but not above, 195° F. proceeds for ½ hour.

During the final heating the enzymes are inactivated and during the heating cycle treatment the lard is separated from the pork bones and proteins in the bone fragments are hydrolized and solubilized.

At this point the beef bone treatment is radically and critically changed to immediately chill the contents of the kettle as quickly as possible from 195° F. to 150° F. by discontinuing steam jacket hearing and passing cooling fluid through the kettle jacket.

This rapid chilling is vital to the successful extraction of protein from the pork bones to produce an aqueous protein broth product without an unacceptable bitter flavor and bad odor.

As indicated, the cooking process has taken the pork protein to the soluble stage. As soon as this stage has been reached, further heating above 150° F. must be stopped immediately to prevent further denaturation which would extend the chemical reactions past the soluble protein stage.

After the chilling step the kettle contents are filtered and screened to remove solids from the soup. The next stage in the procedure is to centrifuge the liquids separated by the filtering and screening operations while the liquids are maintained at a temperature in the range of 135° F. to 150° F. This separates the fats from the solution, which becomes lard, and may be further processed in any usual manner to provide a valuable edible lard product.

The resulting liquid or solution after fats have been separated is a protein containing liquid end product which may have a desirable concentration of protein which may average 4–7% by weight, the remainder of the solution being essentially water.

This protein solution, if desired, may be concentrated further by vacuum distillation at low temperature, held below 120° F. Such hydrolyzed animal protein may be used as a flavoring agent or protein supplement, depending upon the degree of concentration.

We have discovered that the treatment of pork bones in accordance with the described concepts of the invention is equally successful both with fresh pork bones and cured pork bones.

The term "fresh" pork bones as used herein refers to pork bones produced in deboning fresh pork in a packing house. Such fresh pork bones, as indicated, must be refrigerated and used for protein extraction within 2 to 3 days after deboning.

The term "cured" pork bones as used herein refers to pork bones resulting from deboning cured pork products, such as cured hams, cured shoulders, cured ribs and the like.

The end products of the pork protein extraction procedure are an aqueous protein broth product, lard, and cooked pork bones. The cooked pork bones may be ground and sold as bone meal. It is believed that the minimum thermal shock to which the pork bones are subjected possibly may enable the cooked pork bones to be used for making gelatin.

COMPARATIVE EXAMPLES

The discoveries and new results of the invention have been described in detail above and are quite apparent in comparing two examples of pork bone treatments identified below as Tests Nos. 46 and 47. Test No. 46 is representative of failures in attempts to extract protein from pork bones using one of the two known prior beef bone procedures which has resulted in an aqueous protein solution having a bitter taste and a bad odor. This prior beef bone procedure is identified in U.S. Pat. No. 4,176,199 as Example A.

Test No. 47 is representative of the new highly successful treatment of pork bones to extract protein. It comprises a modification of the other of two known prior beef bone procedures identified in said U.S. Pat. No. 4,176,199 as Exhibit B. This modification combines and coordinates a rapid heating step from 145° F. up to the final 195° F. heating stage in 10 minutes with the vital rapid chilling step from 195° F. to 150° F. after the final heating stage at, but not above, 195° F. has taken place for ½ hour. Test No. 47 provides a maximum yield of protein with no odor or taste problems or characteristics.

COMPARATIVE TESTS

Data concerning Tests Nos. 46 and 47 are described below.

| Test No. 46 | |
| --- | --- |
| Picnic Bones | 360# |
| Water | 300# |
| Salt | 8.5# |
| Papain | 0.2# |
| Cycle | |
| 125° | 1 hr. |
| 145° | 4½ hrs. |
| 175° | ½ hr. |
| Bone weight after cooking | 236# |
| Bone yield | 65.56% |
| Liquid weight after cooking | 387# |
| Lard weight | 49# |
| Lard yield | 13.6% |
| Usuable broth | 337# |
| Protein | 5.8% |
| Broth was concentrated down to 63# in 6¼ hours. | |
| Protein level - 23.1%. | |
| All was discarded because of odor. | |

The notes made, particularly at the conclusion of concentrating the protein solution, stressed by underscoring, that "All [broth] was discarded because of odor."

After this failure and further study of the complex problem, a new procedure was planned characterized by reducing to an absolute minimum the duration of time when the soup was at a temperature between 150° F. and 195° F. That is, the rapid increase and decrease of soup temperature in the 150° F. to 195° F. range was tried which achieved the highly successful results of:

| Test No. 47 | |
| --- | --- |
| Picnic Bones | 270# |
| Water | 225# |
| Salt | 6.2# |
| Papain | 0.15# |
| Cycle | |
| 55°-135° | ¼ hr. Add papain (0.056%) |
| 135° | 1 hr. |
| 145° | 1 hr. |
| Add salt | (2.25%) |
| 145° | 1 hr. |
| 145°-195° | 1/6 hr. |
| 195° | ½ hr. |
| 195°-150° | ⅜ hr. (In Kettle) |
| Bone weight after cooking | 198# |
| Bone yield | 73.33% |
| Lard weight | 35# |
| Lard yield | 13% |
| Usuable broth | 253# |
| Liquid cook gain | 112.5% |
| Protein | 6.0% |
| Excellent run. No odor - good lard separation. | |
| Broth was concentrated to 64# in 5 hrs. Protein 22.7% | |

Following the successful Test No. 47, it was found that the results were repeatable and that the procedure described in detail could be used for extracting protein from cured pork bones as well as fresh pork bones.

Accordingly, the concepts of the discoveries concerning critical features of the invention vital for producing an aqueous protein broth product described, provide new procedures which solve problems that have existed in the art, obtain the new results in pork bone protein extraction, and eliminate difficulties encountered in making the discovery arising with attempts to use prior procedures successful for extraction of protein from another type of animal bones.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description of the invention is by way of example, and the scope of the invention is not limited to the exact details set forth in the Examples.

Having now described the discoveries, features and principles of the invention, the manner in which pork bones are treated, the advantageous, new and useful results obtained, the new and useful procedures, treatments, steps and operations are set forth in the appended claims.

We claim:

1. In a method of extracting protein from animal bones of the type in which crushed bone fragments having a maximum dimension of up to ⅝" are heated in an aqueous mixture of approximately equal amounts by weight of said bone fragments and water, to which mixture are added papain base proteolytic enzymes of the class consisting of Tona-300 and Papain 90L enzymes in the amount by weight of bone fragments of about 3½% Tona-300 enzymes or 1/10th of 1% Papain 90L enzymes; and in which the aqueous bone-enzyme mixture is heated and agitated during a heating cycle at about at least 135° F. but not exceeding about 155° F. for approximtely 3 to 3½ hours with NaCl in the amount of 2% by weight of the bone fragments being added at the end of the second hour of heating; and in which the aqueous bone-enzyme-NaCl mixture following said 3 to 3½ hour heating then is heated at step-up temperatures with a final heating temperature at but not above 195° F. for ½ hour to inactivate the enzymes, followed by filtering and screening the solids from the liquids in the cooked mixture to separate the bone fragments, and then centrifuging the separated liquids to obtain grease products and an aqueous 4% to 7% by weight protein broth; wherein in the extraction of protein from pork bones, the improvement comprises the steps of heating the aqueous bone-enzyme-NaCl mixture, following heating for 3 to 3½ hours at 135° F. to 145° F., rapidly in about 10 minutes to 195° F., then heating at but not above 195° F. for ½ hour, and then extremely rapidly chilling the cooked soup stock down to 150° F. as quickly as possible after said heating at 195° F.

2. The method defined in claim 1 in which the aqueous pork bone-enzyme mixture is heated in the range of 135° F. to 145° F. for three hours; in which the mixture then is heated from 145° F. to 195° F. in 10 minutes; in which the mixture then is heated at 195° F. for ½ hour; and in which the mixture then is chilled from 195° F. to 150° F. in 40 minutes.

3. The method defined in claim 1 in which the pork bones are fresh pork bones.

4. The method defined in claim 1 in which the pork bones are cured pork bones.

5. The method defined in claim 1 in which the rapid chilling of the cooked soup stock, at the end of the ½ hour heating at but not above 195° F., prevents continuing denaturation of the pork protein; so that the reactions during such heating, which have taken the pork protein to the soluble stage, are not extended at temperature above 150° F., which otherwise would permit further denaturation reactions past the soluble protein stage.

6. The method defined in claim 1 in which the aqueous protein broth product has 6% by weight protein.

7. The method defined in claim 6 in which the aqueous protein broth product is concentrated to 22.7% protein by vacuum distillation at below 120° F. for about five hours.

8. The method defined in claim 1 in which NaCl is added to the aqueous bone-enzyme mixture at the end of the second hour of heating in the range of temperatures between 135° F. and 145° F. in the amount of 2.25% by weight of the bone fragments.

9. The method defined in claim 1 in which the steps of heating and chilling the aqueous bone-enzyme-NaCl mixture are carried out not later than two to three days after deboning the pork bones; and in which the pork bones are refrigerated after deboning and until said heating and chilling.

10. The method defined in claim 1 in which the papain based proteolytic enzyme added is Papain 90L, and in which said enzyme is added in the amount by weight of bone fragments of 0.056%.

* * * * *